June 13, 1967  D. E. WANAMAKER  3,325,050
DISPENSING DEVICE
Filed Dec. 4, 1964  2 Sheets-Sheet 1
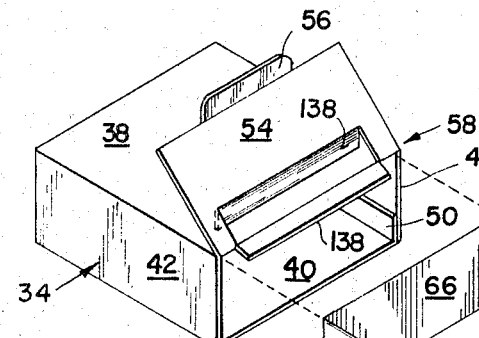
Fig. 2.
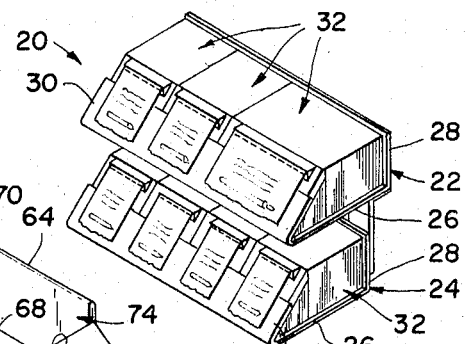
Fig. 1.
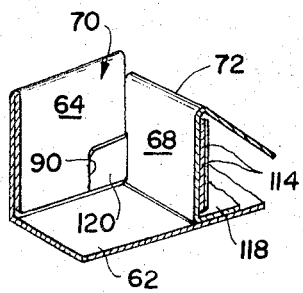
Fig. 5.
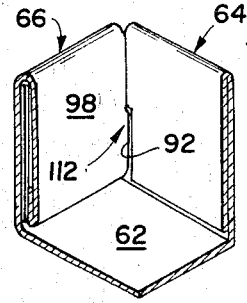
Fig. 6.
Fig. 7.
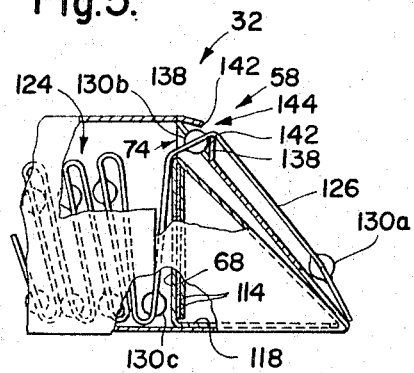
Fig. 8.
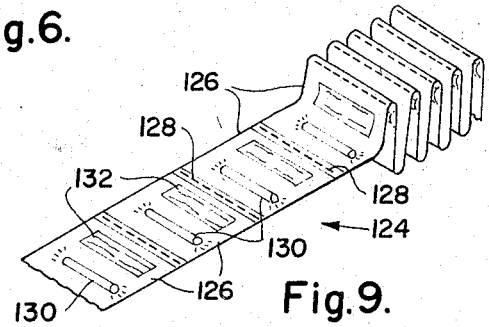
Fig. 9.
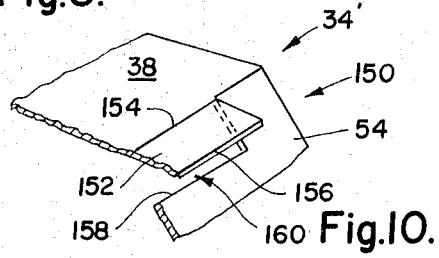
Fig. 10.
INVENTOR.
DONALD E. WANAMAKER
BY
ATTORNEY June 13, 1967    D. E. WANAMAKER    3,325,050
DISPENSING DEVICE
Filed Dec. 4, 1964    2 Sheets-Sheet 2
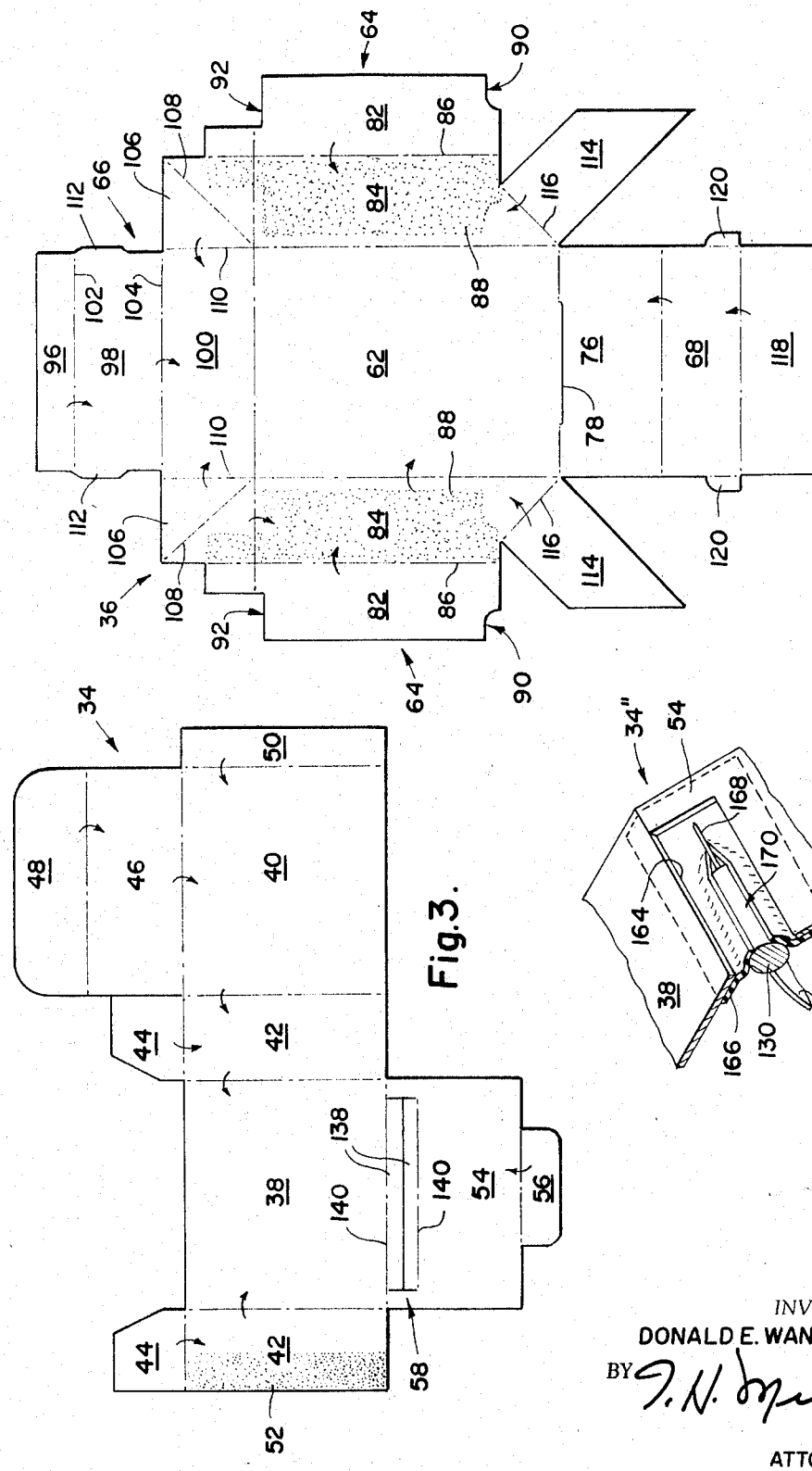
INVENTOR.
DONALD E. WANAMAKER
BY
ATTORNEY

United States Patent Office 3,325,050
Patented June 13, 1967

3,325,050
DISPENSING DEVICE
Donald E. Wanamaker, Dayton, Ohio, assignor to Wall Manufacturing Company, Grove City, Pa., a corporation of Pennsylvania
Filed Dec. 4, 1964, Ser. No. 416,046
4 Claims. (Cl. 221—25)

This invention relates to packaging, and more particularly to a package of a novel configuration which serves primarily as a dispensing device and which also may serve as a shipping container for said articles.

A recent advance in the packaging industry has provided a packaging method wherein a continuous ribbon of individually detachable envelopes is formed, each envelope encasing one or more articles. This packaging method is commonly known as polybelting. Examples of articles which may be packaged in this manner are: fasteners such as screws or nails of various sizes and configurations; writing implements such as pencils and pens; and the like.

This method of packaging has been found extremely useful in packaging articles which are deteriorated by contact with the atmosphere. For example, soldering iron tips formed from a copper core having an iron coating or a chrome plating applied thereto are particularly subject to oxidation by contact with the atmosphere. The soldering iron tips may be sealed within the envelopes of the aforementioned polybelting so that they are protected from oxidation. Furthermore, where the envelopes are formed from transparent material, the soldering tip itself as well as the literature relating to the soldering iron tip, which is printed on the face of the envelope, are visible.

The primary object of the present invention is to provide a dispensing device for storing and dispensing articles packaged by polybelting.

Other important objects of the present invention, include:

To provide a dispensing device having novel means for preventing the inadvertent discharge of the articles contained therein;

To provide a dispensing device having a novel self-locking configuration whereby a minimum amount of adhesive material is employed during its construction;

To provide a dispensing device wherein the next to be dispensed article is displayed whereby dispensing of the articles of incorrect size and configuration is minimized; and To provide a dispensing device which may be quickly and easily assembled and which is relatively inexpensive to manufacture.

In accordance with the present invention there is provided a dispensing device in the form of a closed carton which may serve as a shipping and storage container as well as a dispensing device. Although not limited thereto, the present dispensing device is particularly adapted for storing and dispensing articles which have been packaged by the above described polybelting method. The polybelting strip will hereinafter be termed a continuous ribbon.

The present dispensing device comprises an inner tray-like container inserted within an outer housing. The continuous ribbon is alternately folded to permit easy flow thereof out of the dispensing device, and is inserted within the inner tray-like container. One end, that is, one of the envelopes of the continuous ribbon, projects through an opening provided in the outer housing. Hence, the next to be dispensed envelope is disposed exteriorly of the dispensing device whereby the article as well as the printed literature are in full view.

The present dispenser is provided with novel means overlying the aforesaid opening for preventing the inadvertent discharge of the continuous ribbon, except, during such time as one or more of the encased articles are to be dispensed. This means provides a slit which enlarges during dispensing of the articles and which thereafter contracts to prevent the next article from being discharged. In essence, then, the articles pop out of the dispenser.

The present dispensing device preferably is formed from cardboard and has a sturdy, self-locking configuration whereby a minimum amount of adhesive material is employed during its construction. Furthermore, the present dispensing device is readily adaptable to be inserted in a rack with other ones of the present dispensing device so that a plurality of different sizes or configurations of a specific article may be displayed and easily dispensed when needed. Since each of the dispensing devices contains a continuous ribbon encasing a plurality of articles of a certain size or configuration, no intermixing of the various sizes and configurations is possible. Still further, the present dispensing device considerably reduces the chances of losing a single article.

The above and other objects and advantages of the present invention will become apparent from the following detailed description by reference to the accompanying drawings, in which:

FIGURE 1 is an isometric view illustrating a double tiered rack assembly adapted to support a plurality of the dispensing devices of the present invention;

FIG. 2 is an exploded isometric view of the present dispensing device illustrating an inner container and outer housing thereof;

FIG. 3 is a plan view illustrating a layout of the outer housing of FIG. 2, illustrating the bend lines and cut lines required;

FIG. 4 is a plan view illustrating a layout of the inner container of FIG. 2, indicating the bend lines and cut lines required therein;

FIG. 5 is a fragmentary isometric view of one corner of the inner container illustrating a self-locking feature thereof;

FIG. 6 is a fragmentary isometric view of another corner of the inner container illustrating a second self-locking feature thereof;

FIG. 7 is a side view of the present dispensing device;

FIG. 8 is a side view of the front portion of the present dispensing device, on an enlarged scale, illustrating a means for preventing inadvertent discharge of the continuous ribbon;

FIG. 9 is an isometric view illustrating the continuous ribbon and the method of alternately folding the same prior to its being inserted within the inner container of the present dispensing device;

FIG. 10 is a fragmentary isometric view illustrating an alternative embodiment of a stop means employed in the present dispensing device; and FIG. 11 is a fragmentary isometric view illustrating an alternative means for preventing the inadvertent discharge of the continuous ribbon.

Referring now to FIG. 1, there is illustrated a rack device 20 comprising upper and lower shelves 22, 24. Each of the shelves 22, 24 comprises a base portion 26 having an upright rear leg 28 and an upwardly and inwardly inclined front leg 30. Each of the shelves 22, 24 is adapted to receive and support a plurality of dispensing devices 32 constructed in accordance with the present invention. Each of the dispensing devices 32 is generally rectangular and includes a wedge-shaped front portion adapted to be received and retained within the V-shaped slot formed by the front leg 30 and the base portion 26 of the shelves 22, 24. The rack device 20 comprises a convenient storage means for a plurality of the present dispensing devices 32 as is ideally suited for production line stations, stock distribution points, and general sales displays.

Referring now to FIG. 2, the present dispensing device 32 comprises, in general an outer housing 34 and an inner tray-like container 36.

Referring to FIGS. 2 and 3, the outer housing 34 includes top and bottom walls 38, 40; side walls 42; an end wall comprising, as best shown in FIG. 3, side flaps 44, one each integral with the end of the side walls 42 and an end flap 46 having a tongue 48 integral therewith and which is received within the housing 34 beneath the top wall 38; a lap flap 50 integral with one side of the bottom wall 40 and adapted to overlie the inner face of one of the side walls 42 and be secured thereto by means of an adhesive 52; and a front flap 54 having a tongue 56 integral therewith and stop means 58 which will be described in greater detail later in this specification.

In FIG. 3, the lines along which the various portions are to be bent to form the outer housing 34 in the configuration illustrated in FIG. 2, are indicated by dash-dot lines. The directions in which the various portions are to be pivoted about the dash-dot lines, are indicated by arcuate arrows. Since the outer housing 34, is, in essence, a conventional box, its construction from the layout illustrated in FIG. 3, is believed to be self-evident.

Referring to FIG. 2, the inner tray-like container 36 comprises a bottom wall 62, side walls 64, back wall 66 and front wall 68. The walls 62–68 cooperate to define an interior space 70 within which the aforementioned continuous ribbon is stored. As can be seen in FIG. 2, the front wall 68 has an upper edge 72 which is disposed below the upper edges of the walls 64, 66. The upper edge 72 cooperates with the leading edge of the top wall 38 of the outer housing 34 to define a first opening 74 through which the aforementioned continuous ribbon is discharged. As can be seen in FIG. 2, the bottom wall 62 extends forwardly of the front wall 68. A rearwardly and upwardly inclined wall member 76 is integral with each and extends between the leading edge of the lower wall 62 and the upper edge 72 of the front wall 68. At the intersection of the inclined wall member 76 and the bottom wall 62, there is provided a slot 78 adapted to receive the tongue 56 of the front flap 54 of the outer housing 34.

The inner tray-like container 36 has a self-locking construction whereby a minimum amount of adhesive material is necessary for its fabrication. Furthermore, the inner tray-like container 36 is a sturdy container and may be subjected to considerable amount of handling without damaging the same.

The inner tray-like container 36 is constructed from a sheet cut in the shape illustrated in FIG. 4. As can be seen in FIG. 4, the side walls 64, each comprises side flaps 82, 84. The side flaps 82 are pivoted along the bend line 86 so that each overlies one of the side flaps 84 and is secured thereto by means of an adhesive 88 applied to the inner face of the side flap 84. Each of the side flaps 82 includes a recess 90 at the forward edge thereof and a recess 92 at the rearward edge thereof, the recesses 90, 92 forming part of the self-locking construction which is to be described later in the specification.

The end wall 66 comprises back flaps 96, 98 and 100 which are pivoted, in turn, about the bend lines 102, 104, respectively. Square flaps 106 each are integral with one side of the back flap 100 and one side of the side flap 84. Each of the square flaps 106 is raised out of the plane of the drawing and creased along the diagonal bend line 108 and folded along the bend line 110 so that it overlies the inner surface of the back flap 100. The width of the back flaps 96, 98 is shorter than the width of the back flap 100 so as to compensate for the double thickness of the side walls 64. The back flap 98 is provided at each side thereof with a projecting tongue 112 which, as can be seen in FIG. 6, is received within the recess 92 to lock the back flaps 96, 98 in position. Hence, the construction of the rear wall 66 of the inner tray-like container 36 does not require an adhesive material.

At the end of the side flaps 84 opposite the square flaps 106, there is provided angled flaps 114 both of which are pivoted about inclined bend lines 116, toward one another. As can be seen in FIG. 5, the angled flaps 114 are engaged with each other and the inner face of the front wall 68, thereby providing additional strength for the front wall 68.

Referring still to FIG. 4, the bottom wall 62 has the above-described inclined wall member 76 and the front wall 68 extending from its lower edge. The front wall 68 includes an outer flap 118 which, as can be seen in FIG. 5, is bent at right angles with the front wall 68 and is inserted beneath the angled flaps 114. At each side of the front wall 68 there is provided a projecting tongue 120 which, as can be seen in FIG. 5, is bent rearwardly of and at right angles to the front wall 68. Each of the projecting flaps 120 is received within the recess 90 of the side wall 64 and is coplanar with the side flaps 82. The projecting flaps 120 cooperate with the recesses 90 to lock the front wall 68 in its vertical position. Hence the assembly of the front wall 68 with the side walls 64 does not require adhesive materials.

Referring now to FIG. 9, there is illustrated a continuous ribbon 124 comprising a plurality of individually detachable envelopes 126. The continuous ribbon 124 is provided with perforations 128 at the adjacent ends of the envelopes 126 to facilitate separation of each of the envelopes 126. The continuous ribbon 124 may be formed from transparent material whereby the encased articles, illustrated herein as soldering iron tips 130, will be visible. Each of the envelopes 126 may be provided with printed matter, as at 132, stating, for example, the manufacturer's name, the size, composition, and any other pertinent information. Prior to insertion into the inner tray-like container 36, the continuous ribbon 124 preferably is alternately folded in the manner illustrated in FIG. 9 Thereafter, the alternately folded continuous ribbon 124 is placed within the inner container 36 as illustrated in FIG. 8.

As stated above, the present dispensing device 32 is provided with the stop means 58 for preventing inadvertent discharge of the continuous ribbon 124. However, the stop means 58 does permit one or more of the encased articles to be discharged as and when desired. Referring now to FIGS. 2, 3 and 8, the stop means 58 preferably comprises a pair of opposed flap members 138 cut in the front flap member 54 adjacent to the top wall 38 of the outer housing 34. Each of the flap members 138 is bent along a flexure line 140 (see FIG. 3) to the positions illustrated in FIGS. 7 and 8. Each of the opposed flap members 138 is bendable about the flexure lines 140 whereby the adjacent edges 142 thereof define an enlargeable slit 144 through which the continuous ribbon 124 and the encased articles are permitted to pass.

As can be seen in FIG. 8, one of the envelopes 126 of the continuous ribbon 124 is disposed exteriorly of the dispensing device 32 so as to display the encased article indicated at 130a and the printed matter provided thereon. The next to be dispensed article indicated at 130b, is shown engaged with the pair of opposed flap members 138 and thereby prevented from being inadvertently discharged from the dispensing device 32. When the article 130a is to be dispensed, the envelope 126 is pulled so that the article 130b pops through the stop means 58 and until the next article indicated at 130c, engages the pair of opposed flap members 138. At this time, the continuous ribbon is torn along the perforations 128 (see FIG. 9) so that the envelope 126 to be dispensed is detached therefrom.

Alternative embodiments of the stop means employed in the present dispensing device 32 are illustrated in FIGS.

10 and 11. Corresponding numerals will be employed to identify corresponding parts already described.

In FIG. 10, an outer housing 34' is illustrated wherein the front flap 54 is provided with a stop means generally designated by the numeral 150. In this embodiment, the stop means 150 comprises a single flap member 152 which is cut from the end flap 54 and which is bendable about a flexure line 154. The leading edge 156 cooperates with an edge 158 of the front flap 54 to provide an enlargeable slit 160 through which the continuous ribbon 124 and the articles encased therein will be discharged. The stop means 150 functions the same as the stop means 58 of the preferred embodiment.

In FIG. 11, there is illustrated an outer housing 34" having an end flap 54 in which an opening 164 is provided. A diaphragm 166, preferably formed from rubber, has its peripheral edge secured to the inner face of the top wall 38 and the end flap 54 so that it covers the opening 164. The diaphragm 166 is provided with a cut 168 extending transversely thereof and disposed centrally of the opening 164. The cut 168 provides an enlargeable slit 170 through which the continuous ribbon 124 and the encased articles 130 will be discharged.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A dispensing device comprising an outer housing having an end flap projecting therefrom; an inner housing disposed within said outer housing which is open at its top and having a downwardly and outwardly inclined front wall, the upper edge of said inclined front wall terminating at a level below the top wall of said outer housing and cooperating therewith to define a first opening; a continuous ribbon comprising a plurality of individually detachable envelopes each of which encases at least one of the articles to be dispensed, said ribbon being disposed within said inner container; said end flap of said outer housing overlying said inclined front wall; means for detachably securing said end flap to said inclined front wall; and means forming an enlargeable slit in said end flap adjacent to the top wall of said outer housing for providing an enlargeable second opening through which said ribbon and the encased articles may pass.

2. The dispensing device of claim 1 wherein said means forming an enlargeable slit comprises at least one flap member formed from a portion of said end flap adjacent the top wall of said outer housing and above said opening.

3. The dispensing device of claim 1 wherein said means forming an enlargeable slit comprises a pair of opposed flap members formed from adjacent portions of said end flap, said flap members being bendable outwardly of said end flap.

4. The dispensing device of claim 1 wherein said means forming an enlargeable slit comprises a resilient diaphragm covering an opening provided in said end flap, said resilient diaphragm having a slit therein extending parallel with the width of said continuous ribbon.

References Cited

UNITED STATES PATENTS

| | | | |
|---|---|---|---|
| 2,214,380 | 9/1940 | Nisbet | 206—58 X |
| 2,598,050 | 5/1952 | Guyer | 229—17 |
| 2,878,928 | 3/1959 | Ivy | 206—56 |
| 3,115,989 | 12/1963 | Strang | 221—25 |
| 3,217,954 | 11/1965 | Grant et al. | 221—70 |
| 3,258,017 | 6/1966 | Albert | 206—56 |

FOREIGN PATENTS

| | | |
|---|---|---|
| 123,957 | 10/1930 | Austria. |
| 805,214 | 9/1952 | Germany. |
| 16,134 | 1903 | Great Britain. |
| 374,929 | 3/1964 | Switzerland. |

THERON E. CONDON, *Primary Examiner.*

MARTHA L. RICE, *Examiner.*